Patented Nov. 8, 1927.

1,648,563

UNITED STATES PATENT OFFICE.

HARRY D. MORTON, OF NEW YORK, N. Y., ASSIGNOR TO AUTOMATIC ARC WELDING COMPANY, OF DETROIT, MICHIGAN, A CORPORATION OF MICHIGAN.

ELECTRIC-ARC WELDING APPARATUS.

Original application filed January 27, 1917, Serial No. 144,930. Renewed August 14, 1917, Serial No. 186,238. Divided and this application filed August 20, 1927. Serial No. 214,264.

My invention relates to electric arc welding in which a metallic electrode in the form of a strip of wire or welding material is fed to the arc and to the work, which constitutes the other electrode in the circuit.

The present application constitutes a division of my copending application Serial No. 186,238, filed August 14, 1917 (renewal of application Serial No. 144,930, filed January 27, 1917). The present invention is particularly directed to apparatus wherein the control of the welding strip is effected by the action of clutch devices, which are preferably of the electro-magnetic type, governed by a variable characteristic of the welding circuit.

The following is a description of electric arc welding apparatus embodying the present invention in its preferred form, but it will be understood that various modifications and changes may be made therein without departing from the spirit of the invention and without exceeding the scope of the claims.

Figure 1:
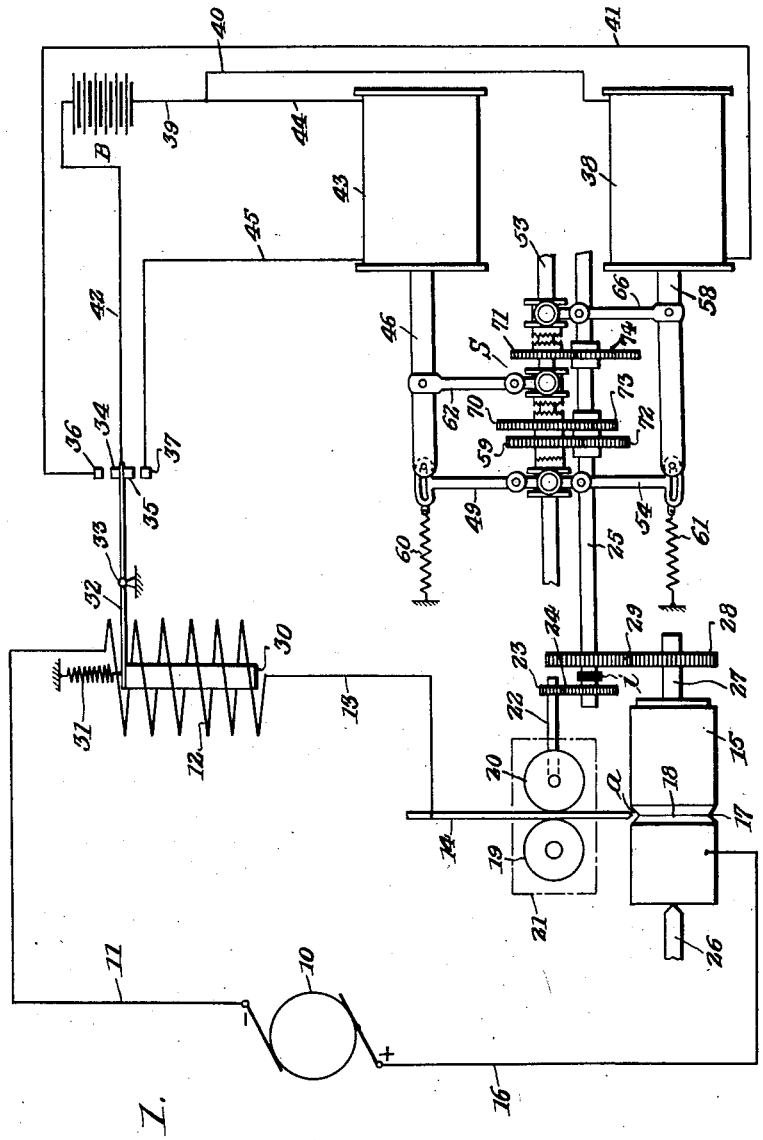
Figure 2:
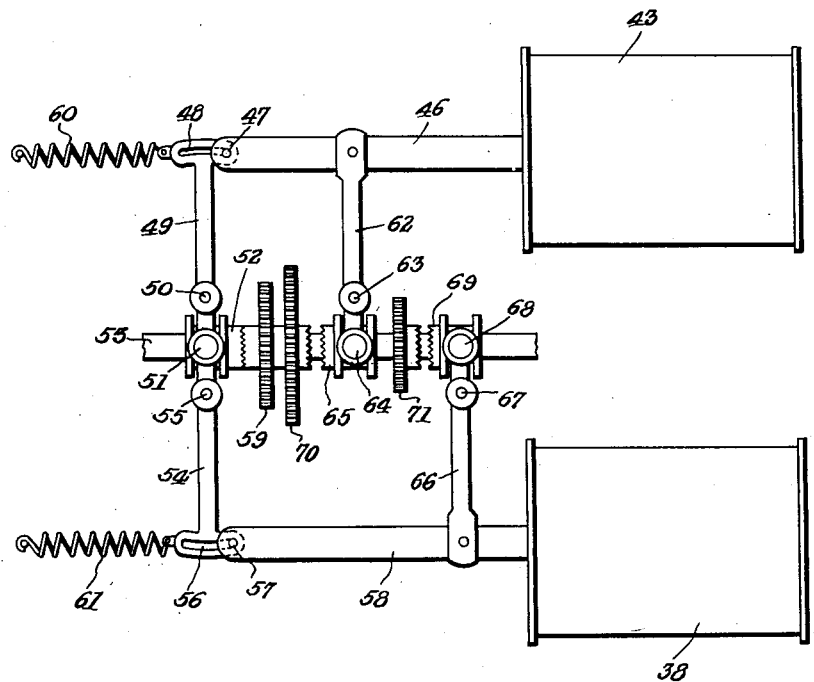

The invention will best be understood by reference to the accompanying drawings, wherein Fig. 1 is a diagrammatic illustration of a system and apparatus embodying the present invention; and Fig. 2 is a view on an enlarged scale illustrating the change-speed mechanism shown in connection with the system of Fig. 1.

Like reference characters indicate like parts in the two drawings.

I have found that it is essential for the practical successful operation of this form of electric arc welding that an equilibrium be maintained between the rate of fusing of a strip of welding material and the rate at which said welding material is fed to the arc. I have found that under some conditions and within narrow limits this equilibrium is maintained by the arc itself which has, within certain limits, if the welding strip is continuously fed at a suitable constant rate, a compensatory action as follows: when the arc shortens the resistance decreases, the amperage rises, and this rise in amperage results in the welding strip fusing more rapidly, thereby causing the arc to lengthen. Conversely, if the arc lengthens the resistance is increased, the amperage decreases proportionately, the welding strip is fused more slowly and the continuously moving welding strip restores the arc to its normal length.

While as I have stated this compensatory action of the arc may maintain the necessary equilibrium between the rate of fusing and the rate of welding strip feed, this applies only within relatively narrow limits. I have found in practice that due perhaps to differences in the fusibility or conductivity of the welding strip or of the work it frequently occurs that the range of compensatory action of the arc is insufficient to prevent either a contacting of the welding strip with the work or a rupture of the arc due to its becoming too long.

To overcome this difficulty I have devised a method and system by means of which the equilibrium is maintained within any desired limit by controlling the rate at which the welding strip is fed to the arc.

Referring to Figure 1, 10 designates an electric generator or other suitable source of current for supplying electric welding current to the welding circuit which includes the wire 11, solenoid 12, wire 13, welding strip 14, work 15 and return wire 16. It will be understood that in welding operation an arc is formed at $a$ between the end of the welding strip and the groove 17 in the work 15. For the purpose of welding two plates or parts together the ends to be joined are tapered and placed in abutting relation thereby forming the groove 17 and the intense heat of the arc at $a$ rapidly melts the metallic strip 14 and deposits it in the groove 17 thereby uniting the pieces of metal at the joint 18. On account of the fact that the intense heat at the arc $a$ melts the strip 14 very rapidly it is necessary to feed this strip from a reel to the arc uninterruptedly and automatically to produce a homogeneous weld.

The feeding mechanism for feeding the metallic welding strip 14 to the work 15 consists of two feed rollers 19 and 20, preferably provided with serrated perimeters, located to receive between them the welding strip 14 which is in the form of a wire. The feed rolls 19 and 20 are rotatably mounted in a welding head 21 which is indicated in dotted lines and provided with suitable guides for the welding strip 14. The feed rolls may be geared together and are driven by a shaft 22 connected by the gears 23 and 24 to a jack shaft 25. The work 15 in the present case consists of two cylindrical members which are to be joined by an annular weld and in order to do this the work is rotated while the welding strip 14 is being fed to the arc at $a$ and while the molten metal formed is being deposited in the groove 17. The cylindrical members constituting the work 15 are rotatably supported in some suitable manner as by the center 26 and a mandrel 27. The mandrel 27 is connected by the gear 28 to a gear 29 keyed to the shaft 25. It will be seen that by this arrangement the jack shaft 25 drives the feed rolls 19 and 20 and also produces a relative movement between the work and the welding head while the strip 14 is being fed to the work and the molten metal is being deposited on the work. It will also be noted that the feed rolls are driven at a higher speed than the work, since the ratio of the gears 23 and 24 is about as 1 to 7. The gears 28 and 29 being of the same size will cause the work 15 to be rotated at the same speed as the shaft 25. A fixed relation is preserved between the feed of the welding strip 14 and the rate of movement of the work 15 but the feed of the welding strip 14 is varied because the welding strip cannot be made uniform throughout its entire length. Different portions of the welding strip may vary in fusibility or be of slightly differing diameters and the strip will therefore fuse at different rates. When the welding strip 14 fuses very rapidly there is a danger that the arc at $a$ may suddenly become so long as to rupture and then in order to start the arc it is necessary to bring the end of the strip 14 again into contact with the work. Conversely, if the feed of the strip 14 to the arc $a$ is more rapid than the fusion of the welding strip, the welding strip may be fed against the work and cause a short circuit which is injurious to the work and also requires separating the electrodes to again form an arc.

As heretofore explained the arc $a$ has a compensatory action so that within narrow limits the difference in the fusibility of the welding strip 14 will be automatically taken care of by the arc itself. However, in order to take care of the extreme differences of fusibility of the welding strip 14 and irregularities in the contour of the work and thereby maintain the arc I have devised an automatic control mechanism which is responsive to the changes in the amperage of the arc $a$ resulting from the varying rate of melting of the welding strip and from irregularities in the contour of the work; and which will alter the rate of feed of the welding strip 14 to correct the variations of the arc and thus compensate for the differences in fusibility of the feeding strip.

My arrangement for changing the rate of feed of the welding strip includes a change speed mechanism designated generally by the letter S which is actuated by the variations of the welding current flowing through the control solenoid 12. The solenoid 12 has a plunger 30, the upper end of which is connected to a spring 31 fixed at its upper end. The switch arm 32 is connected to the plunger 30 and is fulcrumed at 33. The arm 32 carries switch contacts 34 and 35 at its outer end which are normally maintained between the switch contacts 36 and 37 by reason of the fact that the spring 31 is adjusted so as to hold the plunger 30 in equilibrium in the solenoid 12 while the value of the current flowing in the welding circuit is normal. This condition prevails when the arc at $a$ is normal, that is, when the feed of the welding strip 14 is at the proper rate to keep the arc $a$ within certain predetermined limits which will produce a substantially homogeneous weld and prevent either short-circuiting of the welding strip or rupture of the arc. When an excess of current is caused to flow through the solenoid coil 12 due to the fact that the feed of the welding strip 14 is faster than its fusion, the plunger 30 will move downwardly and close the contacts 34 and 36 and energize the slow speed solenoid 38 by the following path: battery B, wire 39, wire 40, solenoid 38, wire 41, contacts 36 and 34, wire 42 back to battery B. When the slow speed solenoid 38 is energized it will cause the welding strip feeding mechanism to slow down and the normal length of arc will thereby be restored, by the speed change mechanism S to be described. On the other hand when the flow of current in the welding circuit decreases on account of the fact that a part of the welding strip 14 fuses faster than it is fed to the arc $a$, the arc $a$ will be lengthened and unless this condition is corrected the arc will rupture. The spring 31 overcomes the pull of the solenoid 12 on the plunger 30 when this condition exists and causes the contact 35 to engage the contact 37 thereby closing the local circuit which includes the high speed solenoid 43 by the following path: battery B, wires 39 and 44, high speed solenoid 43, wire 45, contacts 37 and 35, wire 42 to battery B. By energizing the high speed solenoid 43 the change speed transmission S is caused to operate to speed up the feed of the welding strip to restore the arc $a$ to its normal length.

The change speed transmission is shown on a larger scale in Figure 2 and includes the slow speed solenoid 38 and the high speed solenoid 43. The armature 46 of the high speed solenoid 43 has a pin 47 which moves in the segmental slot 48 whereby it is connected to the normal speed lever 49. The normal speed lever 49 has its fulcrum at 50 and is connected at its short end to a pin 51, which fits in the groove of a clutch 52 connected to but slidable along the drive shaft 53 which may be a line shaft or the shaft of an electric motor or other driving means. The pin 51 also has a lever 54 connected to it, the fulcrum of the latter being at 55. The long end of the lever 54 is provided with a segmental slot 56 in which a pin 57 moves and by means of which the lever 54 is connected to the armature 58 of the slow speed solenoid 38. The clutch 52 is usually held in engagement with the corresponding clutch teeth of a normal speed gear 59 by means of the springs 60 and 61 attached to the long arms of the levers 49 and 54 respectively. The armature 46 of the high speed solenoid 43 is connected to the end of a lever 62 fulcrumed at 63. The shorter end of the lever 62 carries a pin 64 which moves in a groove of the high speed clutch 65, said clutch being connected to the shaft 53 but sliding thereon. The armature 58 of the slow speed solenoid 38 is connected to a lever 66 fulcrumed at 67 and carrying a pin 68 which moves in a groove of the slow speed clutch 69, keyed to the shaft 53 but slidable thereon. The gears 59, 70 and 71 carried by the shaft 53 mesh with the gears 72, 73 and 74 keyed to the jack shaft.

When the arc lengthens the high speed solenoid 43 will be energized, attracting the armature 46, disengaging the clutch 52 from contact with the normal speed gear 59 and simultaneously causing the high speed clutch 65 to engage the clutch teeth of the high speed gear 70 which drives the shaft 25 through the gear 73 at a higher than normal speed thereby feeding the welding strip 14 more rapidly. When the circuit of the solenoid 43 is broken as the result of the arc having resumed its natural length, the spring 60 draws the armature 46 to the left, disengaging the high speed clutch 65 and reengaging the normal speed clutch 52.

When the arc shortens the circuit of the slow speed solenoid 38 is closed as already explained, causing the armature 58 to move to the right, disengaging the clutch 52 from contact with the clutch of the normal speed gear 59 and simultaneously causing the low speed clutch 69 to engage the clutch teeth of the low speed gear 71. The low speed gear 71 will then drive the jack shaft 25 at a lower than normal speed, restoring the arc to its normal length. When the circuit of the solenoid 38 is broken as a result of the arc having resumed its natural length, the spring 61 draws the armature 58 to the left, disengaging the low speed clutch 69 and reengaging the normal speed clutch 52.

It will be noted that the three clutches on the drive shaft 53 are interlocking, i. e. but one can be engaged at a time, the other two being held automatically out of contact.

When either lever 49 or lever 54 acts to disengage the clutch 52 there is a movement of the opposite lever but this movement does not affect the opposite armature with its high speed or low speed lever (as the case may be), for the reason that the segment of such opposite lever moves in the slotted portion of its armature, such armature remaining stationary.

It is to be understood that the system shown in Figure 1 is merely illustrative and that the well-known arc-starting devices, ballistic resistances, reactances, and manipulating means such as switches, etc., common in the art, are omitted; and that numerous other systems may be employed for carrying out the same method and obtaining the same results.

It is to be understood that when the contour of the work varies, it is necessary to vary the relation between the fusing rate and the feeding rate of the strip. For instance, if an elevation or proturbance in the work is encountered, it then becomes necessary to fuse the strip faster than it is fed. On the other hand, if a depression in the work is encountered, it becomes necessary to feed the strip faster than it is fused.

By the term "a characteristic of the arc" as used in the claims, I intend to include such variable, utilizable properties as accompany the operation of an arc, and which are indicative of its normal or abnormal operation, such, for example, as its current, voltage, resistance, length, or energy absorption.

I claim:

1. In electric arc welding, a welding circuit including work material and a welding pencil, means for effecting relative movement between said work material and pencil, a relay responsive to variations in a characteristic of the welding circuit, and a clutch controlled by said relay for governing said means for effecting relative movement.

2. In electric arc welding, a welding circuit including work material and a welding pencil, welding pencil feeding means, a clutch for regulating the speed of the feeding means, and a relay controlling said clutch and governed by said welding circuit.

3. In electric arc welding, means for feeding a welding pencil to an arc struck between said pencil and work material, a relay responsive to changes in arc length, and a clutch governed by the relay and controlling the said feeding means.

4. In electric arc welding, means for utilizing the heat of the arc to fuse work material, said means comprising a welding circuit including two electrodes between which an arc is adapted to be struck, electro-feeding means, a clutch controlling said feeding means, and a relay responsive to conditions in the welding circuit for governing the clutch.

5. In electric arc welding, the combination of a welding circuit, work material and a welding pencil included in said circuit, welding pencil feeding means, a variable-speed clutch for governing the feeding means and actuated by an electrical translating device and a relay responsive to changes in arc length for controlling said translating device.

6. In electric arc welding wherein an arc is adapted to be struck between work material and a welding pencil, means for effecting relative movement between said pencil and work material, a relay connected to the welding circuit, an electro-responsive device controlled by the relay, and a clutch governed by the electro-responsive device for varying the speed of said means for effecting relative movement.

7. In electric arc welding wherein an arc is adapted to be struck between work material and a welding pencil, means for feeding the welding pencil in order to maintain the arc, a relay responsive to variations in a characteristic of the arc, and a clutch governed by the relay and controlling the speed of the feeding means to regulate the arc.

8. In electric arc welding wherein an arc is adapted to be struck between work material and a welding pencil, means for maintaining the arc comprising welding pencil feeding means, a clutch for varying the speed of said feeding means, and a relay responsive to changes in a characteristic of the arc for controlling the movements of the clutch.

9. In electric arc welding wherein an arc is adapted to be struck between work material and a fusible welding pencil, means for maintaining the arc comprising welding-pencil feeding means, a relay responsive to a characteristic of the welding circuit, and a clutch controlled by the relay and governing the feeding means and characterized by the fact that when the arc shortens the feeding rate of the welding strip becomes less than the fusing rate, and when the arc lengthens said feeding rate becomes greater than the fusing rate.

10. In electric arc welding wherein an arc is struck between work material and a fusible welding strip included in a welding circuit, the combination of means for feeding said strip to the arc, a relay controlled by the welding circuit, and a clutch governed by the relay and regulating the feeding means, whereby the length of the arc is maintained substantially constant.

11. In electric arc welding, the combination of a welding circuit including work material and a welding electrode between which an arc is adapted to be struck, means for feeding the electrode to the arc, an electrical translating device responsive in energization to an arc characteristic, another electrical translating device controlled by said first-named translating device, and a clutch mechanism governed by said second translating device for varying the speed of the feeding means to regulate the arc length.

12. In electric arc welding, a welding circuit including a welding pencil and work material between which an arc is adapted to be struck, electro-responsive control means connected to the welding circuit, an electro-responsive clutch device governed by said control means, and means controlled by said clutch device for feeding the welding pencil toward the work.

13. In electric arc welding, a welding circuit including a welding pencil and work material between which an arc is adapted to be struck, a relay responsive to an electrical characteristic of the welding circuit, an electro-magnetic clutch controlled by said relay, and means controlled by said clutch for feeding the welding pencil to the arc.

14. In electric arc welding, a welding circuit including work material and an electrode between which an arc is adapted to be struck, means for feeding the electrode toward the work, driving means for said feeding means, a clutch between said driving means and feeding means, and a relay governed by the welding circuit for controlling said clutch.

15. In electric arc welding, a welding circuit including work material and a metallic welding strip between which an arc is adapted to be struck, means for feeding the welding strip to the arc, driving means for the feeding means, a driving connection between said driving and feeding means, an electro-magnet for controlling said connection and electro-responsive means actuated by changes in arc length for controlling said electro-magnet.

16. In electric arc welding, a welding circuit including work material and a welding pencil between which an arc is adapted to be struck, means for feeding the pencil to the arc, driving means for the feeding means, a driving connection between said driving and feeding means, an electro-magnet controlling said connection, an electric circuit including the winding of said electro-magnet, and means responsive to a characteristic of the welding circuit for controlling said last-named circuit.

17. In a metallic electrode arc welding machine, the combination of a driving shaft, a driven shaft, gearing connecting said shafts comprising a low speed gear, a normal speed gear and a high speed gear, means whereby the normal speed gear normally connects the driving and driven shafts, and automatically-acting means for causing the release of the normal speed gearing and simultaneously causing either the high speed gear or the low speed gear to connect the driving shaft to the driven shaft.

18. In a metallic electrode arc welding machine, the combination of a driving shaft, normal, high and low speed gears on said driving shaft, a driven shaft, gearing on the driven shaft adapted to mesh with the gears on the driving shaft, means whereby the normal speed gear is normally connected to part of the gearing on the driven shaft, solenoids for controlling the connection of the high and low speed gears of the driving shaft to gearing on the driven shaft, and means for automatically actuating said solenoids to cause either one to release the normal speed gear and mechanically connect either the high or low speed gear to the driving shaft whereby either the high or low speed gear drives the driven shaft.

19. In a metallic electrode arc welding machine, the combination of a driving shaft carrying high, normal and low speed gears, a driven shaft carrying gears meshing with the high, normal and low speed gears on the driving shaft, clutches for mechanically connecting the high, normal and low speed gears to the driving shaft, high speed and low speed solenoids for operating said clutches, means whereby said solenoids normally cause one of said clutches to mechanically connect the normal speed gear to the driving shaft, an electric circuit for closing the circuit of either of said solenoids to energize the same, means whereby when the high speed solenoid is energized the first clutch is released to release the normal speed gear and a second clutch connects the high speed gear to the driving shaft, and means whereby when the low speed solenoid is energized the first gear is released to release the normal speed gear and connect the low speed gear to the driving shaft.

20. In a metallic electrode electric arc welding machine in which a welding strip constitutes one electrode and the work constitutes the other electrode, the combination of a welding strip carrier, means for effecting relative movement between the work and the welding strip carrier, means for feeding said welding strip from the carrier toward the work whereby molten metal is deposited on the work while the carrier and work are moving relatively to each other, gearing for driving said strip feeding means, clutches controlling said gearing, solenoids actuating said clutches, electric circuits including said solenoids, switches controlling said electric circuits, and electro-magnetic means responsive to changes in the amperage of the arc for operating said switches whereby changes in said arc amperage vary the rate at which the welding strip is fed to the arc.

HARRY D. MORTON.

CERTIFICATE OF CORRECTION.

Patent No. 1,648,563.     Granted November 8, 1927, to

HARRY D. MORTON.

It is hereby certified that error appears in the printed specification of the above numbered patent requiring correction as follows: Page 3, line 128, claim 4, for the word "electro" read "electrode"; and that the said Letters Patent should be read with this correction therein that the same may conform to the record of the case in the Patent Office.

Signed and sealed this 14th day of August, A. D. 1928.

(Seal)             M. J. Moore,
                 Acting Commissioner of Patents